Patented Nov. 21, 1950

2,530,366

UNITED STATES PATENT OFFICE 2,530,366

ELECTROPHORETIC DEPOSITION OF ETHYLENE POLYMERS

Allen G. Gray, Cleveland, Ohio, assignor to E. I. du Pont de Nemours & Company, Wilmington, Del., a corporation of Delaware No Drawing. Application January 8, 1947, Serial No. 720,923

3 Claims. (Cl. 204—181)

This invention relates to the electrophoretic deposition of ethylene polymers and is more particularly directed to processes in which an ethylene polymer is electrophoretically deposited anodically by electrolyzing an aqueous dispersion of the ethylene polymer containing an amic acid-type dispersing agent.

Synthetic resins and plastics have already been electrophoretically deposited from their aqueous dispersions, but efforts to electrophoretically deposit ethylene polymers from aqueous dispersions have resulted only in failure. Thus, although it has recognized that substantial advantages would follow the electrophoretic deposition of ethylene polymer, the art has hitherto been unable to accomplish this result.

Recently it has been found that remarkably stable and useful dispersions of ethylene polymers in water can be made using an amic acid-type dispersing agent and milling the ethylene polymer into the dispersion by such means as a Banbury mixer, as covered by U. S. patent application Serial No. 672,153, filed May 24, 1946, by Cupery, now Patent No. 2,496,989.

Now according to the present invention it has been found that ethylene polymers can be electrophoretically deposited rapidly, conveniently, and economically by electrolyzing an aqueous dispersion of the ethylene polymer containing an amic acid-type dispersing agent, using the article upon which the ethylene polymer is to be deposited as the anode. If desired, the cohesion of the electrophoretically deposited ethylene polymer particles may be increased by heating the deposit until fusion occurs.

In making an ethylene polymer dispersion for use according to this invention it is preferred to use as the amic acid-type dispersing agent a salt of the class consisting of water-soluble ammonium and basic amine salts of a polymeric N-monoalkyl substituted amic acid in which the recurring two non-oxo carbonyl groups are attached directly to adjacent carbon atoms of the polymeric chain. By the language "two non-oxo carbonyl groups" is meant two carbonyl groups not joined together by oxygen. Thus, one may use a water-soluble ammonium or basic amine salt of a long chain N-monoalkyl substituted polymeric amic acid or of a mixed N-monoalkyl substituted polymeric acid in which some of the amide nitrogen atoms have a short chain monoalkyl substituent and other of the amide nitrogen atoms have a long chain monoalkyl substituent. By "short chain monoalkyl substituent" is meant that a single alkyl group containing less than seven carbon atoms is attached to the amide nitrogen of the polymeric amic acid. Typical short chain alkyl groups are ethyl, propyl, isopropyl, butyl, amyl and the like. By "long chain monoalkyl substituent" is meant that a single alkyl group containing at least seven carbon atoms is attached to the amide nitrogen of the polymeric amic acid. Typical long chain alkyl groups are heptyl, octyl, decyl, dodecyl, octadecyl and the like.

By "basic amine" is meant an amine having an ionization constant value greater than $1 \times 10^{-6}$, when measured at 25° C. By "water-soluble amine" is meant an amine which is soluble to the extent of at least 5 parts per 100 parts of water at 25° C. Examples of water-soluble basic amines are methylamine, ethylamine, diethylamine, ethanolamine, hydrazine, piperidine, morpholine, and the like.

The aqueous dispersions are made by a process which comprises mechanically working at an elevated temperature of at least 95° C. and up to about 115° C. a normally solid ethylene polymer with a water-soluble ammonium or amine salt of a polymeric N-monoalkyl substituted amic acid until a homogeneous blend is obtained, thereafter cutting off the source of heat and while continuing to do work on the blend gradually adding water containing in solution ammonia or a basic amine until the water-in-polymer dispersion which forms inverts to a polymer-in-water dispersion. The resulting dispersion may be diluted with water to any desired solids content.

As a rule the dispersions used in this invention are made by mechanically working into the ethylene polymer at a temperature of at least 95° C., until a homogeneous blend is obtained, a polymeric N-monoalkyl substituted amic acid in which the recurring two non-oxo-carbonyl groups are directly attached to adjacent carbon atoms in the polymeric chain, thereafter the heat is turned off, water containing a member of the class of ammonia and water-soluble basic amines in amount sufficient to form the water-soluble salt of the amic acid is added, and while cooling there is continued the addition of water containing a member of the class of ammonia and water-soluble basic amines until the water-in-polymer dispersion which forms inverts to a polymer-in-water dispersion. The dispersion thus formed may be reduced to the desired solids content by dilution with water.

In the application of the water-soluble ammonium or amine salts of the polymeric N- monoalkyl substituted amic acids to form the aqueous dispersions, the amount used will generally vary from about 1 to 30% of the weight of ethylene polymer. However, the amount will vary to some extent depending upon the particular amic acid dispersing agent which is used.

The mechanical working of the water-soluble ammonium or amine salt of the polymeric N-monoalkyl substituted amic acid into the ethylene polymer is effected in devices capable of doing internal work on the mixture. Examples of such mixers, which are capable of doing work on the polymer and dispersing agent, are the Banbury and Werner-Pfleiderer types and modifications of these mixers. In the rotary type Banbury mill, the block and rotors can be heated with hot water or steam. When the ethylene polymer is milled in such a device at a temperature a few degrees below its softening point, that is, at temperatures above 95° C., it becomes plastic. The plastic state is best suited for the incorporation of the water-soluble ammonium or amine salt of the polymeric N-monoalkyl substituted amic acid. A homogeneous blend of ethylene polymer and dispersing agent is produced.

Through the employment of the water-soluble ammonium or amine salt of the polymeric N-monoalkyl substituted amic acids, aqueous dispersions which are stable and in which the particles are small and uniform in size can be made. These dispersions may contain up to 75% or more of the ethylene polymer.

The water-soluble ammonium or basic amine salts of the N-monoalkyl substituted polymeric amic acid stabilizers can be made by suspending a polymeric polycarboxylic acid anhydride in an organic solvent, such as benzene, and adding to the suspension, ammonia or an alkyl amine. In the amidation, it is preferred to employ one mole of the ammonia or alkyl amine per mole equivalent of the polymeric polycarboxylic acid anhydride. However, proportions outside this amount can be used. The polymeric N-monoalkyl substituted amic acid thus obtained can be treated with ammonia or amine until it is converted to the ammonium or amine salt. If desired, the ammonium or amine salt can be isolated by filtration or by other means known to the art.

An alternative method for making the ammonium or amine salts of the polymeric N-monoalkyl substituted amic acids, which is particularly applicable to the preparation of long chain N-alkyl polymeric amic acids, is by dissolving the polymeric acid anhydride in a suitable organic solvent, such as methyl ethyl ketone, and adding a long chain primary alkyl amine with stirring. The resulting product is then treated either with dilute ammonium hydroxide or with the desired amine and the salt can be isolated by filtration.

By "polymeric acid anhydride" as used herein is meant the product obtained by condensing a polymerizable organic compound containing an ethylenic double bond as the sole carbon-to-carbon unsaturation with a butenedioic acid anhydride having the general formula

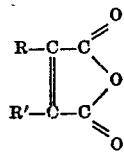

where R and R' are selected from the group consisting of hydrogen atoms and alkyl, aryl, aralkyl and cycloaliphatic radicals, for example, methyl, ethyl, propyl, octadecyl, phenyl, tolyl, xylyl, benzyl, cyclohexyl, and the like. Examples of such polymerizable organic compounds are ethylene, propylene, butylene, isobutylene, styrene, indene, vinyl acetate, methyl methacrylate, and the like. Suitable methods for effecting the condensation between the butenedioic acid anhydride and the polymerizable organic compound are described in U. S. Patents 2,047,398, issued July 14, 1936, and 2,378,629, issued June 19, 1945. In the amic acids prepared from these polymeric acid anhydrides, the two recurring non-oxo carbonyl groups are on adjacent carbon atoms.

The preferred polymeric acid anhydrides for the preparation of the N-monoalkyl substituted amic acids are those obtained by condensing one mole of maleic anhydride with one mole of styrene. Of these, those having a viscosity in the range of from 0.2 to 650 centipoises at 25° C., measured at 15% solutions in methyl ethyl ketone, are preferred.

The N-monoalkyl substituted amic acids obtained by reacting in molar equivalent proportions a styrene-maleic anhydride condensation product, having a viscosity of from 6 to 100 centipoises when measured as a 15% solution in methyl ethyl ketone at 25° C., with a 1:1 mole mixture of butyl and octadecyl amines are particularly preferred. These are converted to the water-soluble ammonium or amine salts, preferably the morpholine salt, by reaction with an amount of ammonia or amine required to react with the free carboxyls in the amic acid.

To electrophoretically deposit an ethylene polymer from a dispersion such as above described a pair of electrodes is inserted in the dispersion, the electrode upon which deposition is desired being made the anode. An electric current is passed through the solution between the electrodes, the voltage and amperage being so chosen as to effect the desired amount of deposition in the given interval of time. A high voltage is not necessary, an adequate flow of current being noted at the relatively low voltages of 6–20 volts. The amount of deposition is, of course, directly proportional to the amount of current flowing through the solution, the efficiency of the process being practically 100%. Using a given voltage an external resistance may be used to control the rate of deposition.

The concentration of ethylene polymer in the electrophoretically depositing solution may be widely varied. It has been noted for instance that with about 40% by weight of ethylene polymer in the dispersion a very high rate of deposition is obtained. The polymer concentration may be varied from 10 to 70%, however, and excellent results may nevertheless be obtained.

The rate of electrophoretic deposition advantageously may be regulated in accordance with the physical character of the anode upon which the ethylene polymer is being deposited. Thus, for relatively regular objects such as metal sheets or wire the rate of deposition may be very high whereas for irregular objects such as metal electroplating racks the rate may be considerably slower.

The electrophoretic deposition processes of the present invention are applicable to the deposition of ethylene polymer either as an intermittent process in which articles to be coated are made anodic in a still tank, or to continuous processes in which such a material as metal sheet or wire is made anodic and passed continuously through the dispersion. Since the rate of deposition is very high the processes are particularly well adapted to the latter use.

The anode may be any material insoluble in the bath and capable of conducting an electric current. Metals are of course especially well suited for use as the anode and the processes are particularly applicable to the coating of iron, steel, or copper wire or sheets with ethylene polymers. The coating thus produced on wire is found to be well centered, and since ethylene polymer has a high dielectric strength the wire is ideally adapted for electrical purposes, particularly after baking at temperatures sufficiently high to fuse the coatings, and then cooling.

It also is possible, according to a process of this invention to produce an ethylene polymer which is a conductor of heat and/or electricity. This may be done, for instance, by electrophoretically depositing the polymer from an aqueous dispersion onto an electrical conductor of relatively small diameter, such as #64 copper wire as the anode, and then, while the deposit is still capable of conducting an electrical current, making it the cathode in an electroplating bath, such as a copper, silver, or tin plating bath, whereby a conducting coating of the metal is built up on the surface of the polymer deposit. Alternatively, there may be included in the aqueous ethylene polymer dispersion a suspended conducting material, such as carbon black or copper powder in a manner such that the conducting material is occluded in the polymer deposit as formed. A surface treatment may be given to the conducting material to give it an electronegative charge so that it will migrate to the anode and co-deposit with the ethylene polymer. A combination of all these methods may be employed.

The invention will be better understood by reference to the following illustrative examples.

*Example I*

An ethylene polymer dispersion for use in a process of the invention was made up in the following manner:

Two hundred parts of an ethylene polymer having a molecular weight of about 17,000 and a softening point of 105°–110° C. is milled in a Banbury mixer at 100° C. To it is added 16 parts of polymeric octadecyl-butyl styrene-maleamic acid, obtained by reacting one mole of a styrene-maleic anhydride polymer (having a viscosity of 14 to 70 centipoises at 25% solids in methyl ethyl ketone at 25° C.) with one mole of an equimolar mixture of n-octadecyl amine and n-butyl amine. When the total octadecyl-butyl styrene-maleamic acid has been incorporated into the ethylene polymer, the steam in the mixer is turned off, an amount of morpholine is added sufficient to form the morpholine salt of the amic acid and the gradual addition of water containing an additional molar quantity of morpholine is begun. As the temperature of the polymer drops, the water is gradually taken up and a water-in-polymer dispersion is formed. Upon continued gradual addition of water, this dispersion inverts to a thick polymer-in-water dispersion of paste-like consistency. On completion of the process of inversion, the solids content of the dispersion is 60-70%. The dispersion can be diluted with water to any desired concentration. The particule size is small and uniform, ranging between 3 and 4 microns.

Into this dispersion was inserted a pair of copper sheets connected to an outside source of electrical current in such a manner that one of the sheets was anodic and the other cathodic. The potential difference between the sheets was 16 volts and the resistance was adjusted by means of an external resistance in the circuit so that the current flowing through the circuit was 2.5 amperes. It was observed that a thick, heavy coating of ethylene polymer was deposited from the dispersion on to the metal at the anode.

*Example II*

The procedure of Example I was repeated using as the anodes bronze electroplating racks. The electrophoresis was carried out until the current almost ceased to flow taking about 30 seconds under the conditions used. The racks were then placed in an oven and heated for one hour at 160–170°. The coatings thus produced were thick, smooth, and continuous, and after the heat fusion were very tough and adherent.

*Example III*

The method of Example I was applied to the problem of continuously coating copper wire by making the wire anodic in the ethylene polymer dispersion and continuously removing the wire as the deposit built up to a thickness of $\frac{1}{16}$ inch. The coated wire was then passed through an oven where it was heated to a temperature which caused the coating to fuse but not sag. The wire was then cooled.

It was found that a coating was thus produced on the wire which was flexible, highly resistant to wear and corrosion, and which had a characteristically high dielectric strength.

I claim:

1. In a process for electrophoretically depositing ethylene polymers the step comprising electrolyzing an aqueous dispersion of an ethylene polymer containing a salt of the class consisting of water-soluble ammonium and basic amine salts of a polymeric N-monoalkyl substituted amic acid in which the recurring two non-oxo carbonyl groups are attached directly to adjacent carbon atoms of the polymeric chain, using an electrical conductor as the anode to receive the deposit of ethylene polymer.

2. In a process for electrophoretically depositing ethylene polymers the step comprising electrolyzing an aqueous dispersion of an ethylene polymer containing a salt of the class consisting of water-soluble ammonium and basic amine salts of a polymeric N-monoalkyl substituted styrene-maleamic acid, using an electrical conductor as the anode to receive the deposit of ethylene polymer.

3. In a process for producing a continuous coating of ethylene polymer upon a metallic conductor the steps comprising electrolyzing an aqueous dispersion of an ethylene polymer containing a salt of the class consisting of water-soluble ammonium and basic amine salts of a polymeric N-monoalkyl substituted amic acid in which the recurring two non-oxo carbonyl groups are attached directly to adjacent carbon atoms of the polymeric chain, using the metallic conductor as the anode, and heating the electrophoretically deposited coating until fusion occurs.

ALLEN G. GRAY.

(References on following page)

REFERENCES CITED

The following references are of record in the file of this patent:

UNITED STATES PATENTS

| Number | Name | Date |
|---|---|---|
| 2,068,424 | Mark et al. | Jan. 19, 1937 |
| 2,079,613 | Holt | May 11, 1937 |
| 2,215,145 | Clayton et al. | Sept. 17, 1940 |
| 2,324,199 | Datin et al. | July 13, 1943 |
| 2,345,543 | Wohnsiedler et al. | Mar. 28, 1944 |
| 2,389,414 | Crofut | Nov. 20, 1945 |
| 2,496,989 | Cupery | Feb. 7, 1950 |

OTHER REFERENCES

Schwartz et al.: Surface Active Agents (1949), p. 221.